United States Patent [19]

Bardhan

[11] Patent Number: 4,712,156
[45] Date of Patent: Dec. 8, 1987

[54] STABILIZED FERROELECTRICS

[75] Inventor: Pronob Bardhan, Corning, N.Y.

[73] Assignee: Corning Glass Works, Corning, N.Y.

[21] Appl. No.: 13,335

[22] Filed: Feb. 11, 1987

[51] Int. Cl.⁴ .................. H01B 3/12; C04B 35/46
[52] U.S. Cl. ..................................... 361/321; 501/135
[58] Field of Search ....................... 361/320, 321; 252/62.3 BT, 62.32 T; 501/134–137

[56] References Cited

U.S. PATENT DOCUMENTS

| | | | |
|---|---|---|---|
| 2,915,407 | 12/1959 | Gulton et al. | 501/134 |
| 4,265,668 | 5/1981 | Fujiwara et al. | 501/134 |
| 4,506,026 | 3/1985 | Hodgkins et al. | 501/135 |
| 4,637,989 | 1/1987 | Ling et al. | 501/134 X |

FOREIGN PATENT DOCUMENTS

| | | | |
|---|---|---|---|
| 151272 | 8/1985 | Japan | 501/135 |
| 1083246 | 3/1984 | U.S.S.R. | 361/321 |

*Primary Examiner*—Donald A. Griffin
*Attorney, Agent, or Firm*—C. S. Janes, Jr.

[57] ABSTRACT

There is disclosed a ceramic ferroelectric material consisting basically of lead magnesium niobate, lead nickel niobate lead titanate, having a stabilized perovskite crystal phase, having a high dielectric constant with a broad or diffuse ferroelectric to paraelectric phase transition, and adapted to being fired at temperatures up to 1200° C. Numerous additives and their effects on dielectric properties are also disclosed.

19 Claims, 2 Drawing Figures

STABILIZED FERROELECTRICS

BACKGROUND

The invention is concerned with a ceramic ferroelectric material having, as one application, a dielectric in capacitors. It is particularly concerned with a ferroelectric system having a stabilized perovskite phase.

A ferroelectric compound, such as $PbMg_{\frac{1}{3}}Nb_{\frac{2}{3}}O_3$, has attractive properties for application as a dielectric. These include a high dielectric constant and a broad or diffuse ferroelectric to paraelectric phase transition.

Formation of this compound is difficult because (1) relatively high temperatures, initiating at about 800° C., are required for synthesis, thus hazarding substantial PbO loss, and (2) a metastable and persistent pyrochlore ($Pb_3Nb_4O_{13}$) phase forms at lower sintering temperatures.

In Paper T4 of *Proceedings of the Japan-US Study Seminar on Dielectric and Piezoelectric Ceramics* (1982), the author, K. Furukawa, suggested adding excess MgO to the starting powder to convert pyrochlore to perovskite. Subsequently, Swartz and Shrout, in an article in *Materials Research Bulletin*, (1982), suggested reacting MgO and $Nb_2O_5$ and combining the reaction products with PbO in proper proportion.

We have found that these expedients do indeed reduce formation of the pyrochlore phase, but that they do not completely suppress it. Further, if the sintered ferroelectric must be reheated in subsequent operations, there is a tendency for pyrochlore to reform at the expense of perovskite. Thus, it would be desirable to find a means of completely suppressing, and keeping suppressed, formation of the destabilizing pyrochlore.

Most dielectrics based on PbO are designed to be fired at a relatively low temperature in the range of 800°–1000° C. in order to be compatible with Ag or Ag-Pd electrodes. In contrast, however, a fugitive carbon type electrode requires a dielectric material capable of being fired at higher temperatures. This electrode is produced with dispersed carbon which is burnt out to leave a porous structure that is impregnated with a lead alloy. It must be fired at temperatures well above 1000° C. to insure against carbon residue, and consequent poor electrical characteristics.

PURPOSES OF THE INVENTION

A basic purpose is to provide a ceramic ferroelectric material having improved properties.

Another purpose is to provide a stabilized ferroelectric having a perovskite phase.

Another purpose is to provide a stabilized ferroelectric having as a base composition $PbMg_{\frac{1}{3}}Nb_{\frac{2}{3}}O_3$.

A further purpose is to provide a ceramic ferroelectric material that can be fired above 1000° C.

Another purpose is to provide a ceramic ferroelectric material for use with a fugitive carbon-type electrode.

Another purpose is to provide ceramic ferroelectrics having a dielectric constant of 16,000–20,000.

A further purpose is to provide a new and improved capacitor having fugitive carbon type electrodes.

A still further purpose is to provide a means of suppressing and keeping suppressed, formation of a pyrochlore phase in a ferroelectric having a primary perovskite phase.

Another purpose is to provide a dielectric which has a high lead content, meets the Z5U EIA temperature specification of +22% to −56% variation in capacitance between 10° C. and 85° C., and has a ferroelectric to paraelectric transition in the temperature range of 0° to 25° C.

SUMMARY OF THE INVENTION

To these and other ends our invention resides in a ferroelectric ceramic composition consisting essentially of 45–85 m/o $PbMg_{\frac{1}{3}}Nb_{\frac{2}{3}}O_3$, 8–40 m/o $PbNi_{\frac{1}{3}}Nb_{\frac{2}{3}}O_3$, and 2–20 m/o $PbTiO_3$. In preferred embodiments, the compositions include one or more additives selected from up to one m/o excess MgO, up to 5 m/o $BaTiO_3$, up to 8 m/o $PbZrO_3$, up to one m/o CuO, up to 3 m/o Cu $Fe_{\frac{2}{3}}W_{\frac{1}{3}}O_3$, up to 9 m/o $PbMg_{\frac{1}{2}}Ti_{\frac{1}{4}}W_{\frac{1}{4}}O_3$, up to ten m/o Pb $Zn_{\frac{1}{3}}Nb_{\frac{2}{3}}O_3$, up to three m/o $PbZn_{\frac{1}{2}}W_{\frac{1}{2}}O_3$, up to one m/o ZnO, up to one m/o of a rare earth metal oxide other than $Pr_6O_{11}$, and up to 6 m/o $PbFe_{\frac{2}{3}}W_{\frac{1}{3}}O_3$. The symbol "m/o" signifies mole percent.

The invention further resides in a ceramic capacitor having a dielectric constant of at least 16,000, a dissipation factor less than 3.0 pct, which meets the Z5U EIA temperature specification of +22% to −56% change in capacitance between 10° C. and 85° C. and consists essentially of 45–85 m/o $PbMg_{\frac{1}{3}}Nb_{\frac{2}{3}}O_3$, 8–40 m/o $PbNi_{\frac{1}{3}}Nb_{\frac{2}{3}}O_3$, and 2–20 m/o $PbTiO_3$. Preferably, the capacitor composition includes, as additives, oxides and/or derivative compounds as listed above.

LITERATURE

In addition to the materials directly referenced elsewhere in the text, attention is directed to the following U.S. patent literature:

U.S. Pat. No. 3,718,595 (Takahashi et al.) discloses compositions in the $PbNi_{\frac{1}{3}}Nb_{\frac{2}{3}}O_3$-$PbTiO_3$-$PbZrO_3$ ternary and the addition of chromium thereto.

U.S. Pat. No. 3,956,150 (Ouchi et al.) discloses strengthening four general classes of ferroelectric ceramics by heat treatment. One class could, by chance, provide a combination of Mg and Ni, but no example is given.

U.S. Pat. No. 4,287,075 (Fujiwara et al.) discloses a solid solution of lead iron niobate, lead magnesium niobate and lead magnesium tungstate. It does not employ lead titanate or lead nickel niobate.

U.S. Pat. No. 4,339,504 (Sakabe et al.) discloses compositions in the lead magnesium niobate-lead zinc niobate-lead titanate ternary.

U.S. Pat. No. 4,265,668 (Fujiwara et al.) discloses compositions of lead magnesium niobate and lead titanate that contain excess magnesia.

U.S. Pat. No. 4,450,240 (Miyamoto et al.) discloses ternary compositions comprising lead magnesium tungstate, lead titanate, and lead nickel niobate.

U.S. Pat. No. 4,525,768 (Wheeler) discloses a dielectric composition containing lead magnesium niobate, lead iron niobate (both being present in non-stoichiometric amounts) and one or more oxide additives. Lead titanate is an optional additive.

U.S. Pat. No. 4,601,988 (Sakabe et al.) discloses a dielectric ceramic composition consisting essentially of lead nickel niobate, lead zinc tungstate, lead titanate and lead copper niobate plus up to 0.5 mole percent $MnO_2$.

In general, the composition disclosures in these patents omit at least one of the basic phases in the currently claimed compositions. This might be expected since several of the patent texts disclose that their compositions are designed to be fired in the relatively low temperature range of 800°–1000° C. This renders them compatible with Ag or Ag-Pd electrodes. Also, these prior dielectrics tend to have lower dielectric constant values that are well below the values of the currently disclosed materials.

GENERAL DESCRIPTION

The major component in the present ferroelectric compositions is lead magnesium niobate, $PbMg_{\frac{1}{3}}Nb_{\frac{2}{3}}O_3$. This material has a high, intrinsic dielectric constant (K) of about 10,000 to 15,000. It also has a broad, or diffuse, ferroelectric to paraelectric phase transition. However, its Curie temperature of $-12°$ C. is too low to be useful, a temperature in the range of $0°-25°$ C. being needed.

The other primary components are lead nickel niobate, $PbNi_{\frac{1}{3}}Nb_{\frac{2}{3}}O_3$, and lead titanate, $PbTiO_3$. The latter is a low-melting, perovskite-type dielectric that facilitates sintering the more refractory niobates to full density. It has a Curie temperature of 475° C. which requires greatly limiting the amount added.

Smolenskii et al. reported, in *Sov. Phys.-Tech. Physics,* 28 147 (1958), that lead magnesium niobate and lead nickel niobate may form a solid solution. However, a mixture of the niobates in 80/20 molar proportions was observed to have a dielectric constant of 1500 and a Curie temperature of $-40°$ C.

Further exploration of the niobate solid solutions, with additions of $PbTiO_3$, revealed that dielectric materials with very high dielectric constants (over 30,000) were obtainable. However, the Curie temperature ($T_c$) increased rapidly as the $PbTiO_3$ content increased. This was countered, but only in small part, by the contrasting tendency of lead nickel niobate to lower the Curie temperature. Thus, the extent that the favorable effect of the niobate solid solutions on dielectric constant can be utilized is limited.

The difficulty encountered with a rising Curie temperature is an adverse effect on dissipation factor. With a Curie temperature near or above ambient, the dissipation factor becomes unacceptably high with values of 8-9%. With Curie temperatures significantly below ambient, the effect on the dissipation factor is negligible.

Within these principal limiting factors then, our ferroelectric base compositions consist essentially of 45-80 mol percent lead magnesium niobate, 8-40 mol percent lead nickel niobate and 2-20 mol percent lead titanate. As indicated above, lead titanate content is governed by the effect on Curie temperature. Even the larger permitted amounts may require the presence of depressors as hereafter considered, and a more limited range of 2-10 mol percent is preferred.

As noted earlier, when a mixture of MgO, PbO and $Nb_2O_5$ in perovskite stoichiometry, that is, $PbMg_{\frac{1}{3}}Nb_{\frac{2}{3}}O_3$, is sintered, there is a strong tendency to form a pyrochlore phase which has a low dielectric constant. Traditionally, this has been dealt with by repeated and lengthy sintering treatments. Other techniques have been proposed as also noted. While these are effective, our work has indicated that the pyrochlore phase is not completely removed. Further, there is a tendency to reform pyrochlore on reheating.

It was observed that formation of a lead magnesium niobate crystal phase in a glass-ceramic composition was greatly facilitated by the presence of oxides forming barium titanate, $BaTiO_3$. Accordingly, similar additions were made to the present ceramic powder mixtures to provide 0.3 m/o excess MgO and 10% $BaTiO_3$. On the plus side, X-ray diffraction patterns showed no trace of pyrochlore, as well as a lower Curie point. It was surmised that the $BaTiO_3$ acted like a seed for a perovskite phase that entered in totality the lead magnesium niobate solid solution. The dielectric properties of the resulting material were decreased by 50%, however, with addition of 10 wt. % (5 m/o) $BaTiO_3$. Thus the need to control the addition of the $BaTiO_3$ phase became apparent. Preferably then, the amount added should not exceed 5 weight percent.

It was noted that the presence of $BaTiO_3$ greatly improved dispersion characteristics of materials to which it was added. The effect of lead zirconate $PbZrO_3$ in promoting sinterability was also studied. While no profound effect on sintering was noted, amounts up to about 8 mole percent were found to dramatically change the temperature coefficient without seriously degrading the dielectric properties of the ceramics. The effect is to raise the Curie point. In these materials, the peak is quite diffuse so that as it approaches 25° C. there is an apparent flattening out of the K vs. T curve in the paraelectric region, that is, above the Tc. Larger amounts of $PbZrO_3$ tend to lower insulation resistance, but amounts up to about 4 mole percent have little effect. While such smaller amounts also have a smaller effect on Curie temperature, they may still be sufficient to improve temperature dependence of the capacitance in the paraelectric state.

Additions of up to 3.0 wt. % CuO (one m/o) were found to improve the temperature dependence of the capacitance between 25° and 85° C. with little effect on the dielectric constant (K). However, it is generally unnecessary to employ over 0.5%. Only one Cu-bearing perovskite was found to provide similar benefits. This is $CuFe_{\frac{2}{3}}W_{\frac{1}{3}}O_3$ which further resulted in higher K values when excess PbO or $WO_3$ were not present. Up to about 3 mole percent has proven useful.

A highly significant factor in selecting high dielectric constant dielectrics is aging rate. This is usually stated as maximum change in percent permitted per decade hour. While no specification exists for an Z5U dielectric, it is generally expected that its aging rate will be 5 to 9%/decade hour.

Our studies indicate that the addition of lead nickel niobate to lead magnesium niobate has a dramatic effect on aging rate such that rates approaching zero are indicated for additions as great as 36 mol percent.

$BaTiO_3$ also lowers the aging rate, but has a much lesser effect than the lead nickel niobate. $PbZrO_3$ has no effect and $PbTiO_3$ and MgO additions increase the rate of aging.

In summary, then, our invention provides ferroelectrics having dielectric constants over 10,000 and with an aging rate of not over 5% per decade hour. It further provides such materials that may be fired at temperatures of 1000°-1200° C. in electrode application.

These ferroelectrics may be considered in terms of a family of compositions within these mole percent ranges:

| | |
|---|---|
| $PbMg_{\frac{1}{3}}Nb_{\frac{2}{3}}O_3$ | 45-85 |
| $PbNi_{\frac{1}{3}}Nb_{\frac{2}{3}}O_3$ | 8-40 |
| $PbTiO_3$ | 2-20 |
| $BaTiO_3$ | 0-10 (wt. %) |
| $PbZrO_3$ | 0-8 |
| CuO | 0-3 (wt. %) |
| $CuFe_{\frac{2}{3}}W_{\frac{1}{3}}O_3$ | 0-3 |
| $PbZn_{\frac{1}{3}}Nb_{\frac{2}{3}}O_3$ | 0-6 |
| $PbZn_{\frac{1}{2}}W_{\frac{1}{2}}O_3$ | 0-6 |
| $PbFe_{\frac{2}{3}}W_{\frac{1}{3}}O_3$ | 0-6 |
| $PbMg_{\frac{1}{2}}W_{\frac{1}{2}}Ti_{\frac{1}{2}}O_3$ | 0-9 |

-continued

| | |
|---|---|
| ZnO | 0–1 |
| Rare earth metal oxides | 0–1 |

In terms of percent by weight on a calculated oxide basis, the ranges of these compositions may be taken as follows:

| Composition Field | |
|---|---|
| PbO | 60.0 wt. % to 70.0 wt. % |
| MgO | 1.0 wt. % to 5.0 wt. % |
| NiO | 0.1 wt. % to 3.1 wt. % |
| $Fe_2O_3$ | 0.0 wt. % to 2.0 wt. % |
| $Nb_2O_5$ | 12.0 wt. % to 27.0 wt. % |
| $TiO_2$ | 1.0 wt. % to 8.0 wt. % |
| $WO_3$ | 0.0 wt. % to 5.0 wt. % |
| BaO | 0.0 wt. % to 3.0 wt. % |
| CuO | 0.0 wt. % to 2.0 wt. % |
| ZnO | 0.0 wt. % to 1.0 wt. % |
| $ZrO_2$ | 0.0 wt. % to 3.0 wt. % |
| Rare-Earths (excluding $CeO_2$, $Pr_6O_{11}$, $La_2O_3$) | 0.0 wt. % to 1.0 wt. % (total) |

In order to obtain materials with both a ferroelectric-to-paraelectric transition in the temperature range of 0° to 25° C. and a temperature dependence of capacitance within EIA specifications for a Z5U capacitor, namely +22 to −56% change in capacitance between 10° and 85° C., we find it necessary to add one or more of the following:

a. up to 0.5 wt.% CuO or up to 3 m/o $CuFe_{\frac{2}{3}}W_{\frac{1}{3}}O_3$,
b. up to ~2 wt.% $BaTiO_3$,
c. up to 4 m/o $PbZrO_3$,
d. up to 1 m/o rare-earth oxides,
e. up to 0.5 w/o ZnO.

Preferably these are added together since, with $BaTiO_3$, the material gets a litte refractory; CuO helps sinterability. Although $BaTiO_3$ lowers $T_c$, it also lowers K at room temperature. To balance this, $PbZrO_3$ can be added. $BaTiO_3$ is added to also (a) improve stability of the perovskite phase, (b) make dielectric processing more predictable, (c) improve the IR characteristics and (d) help keep aging rate low. CuO and $PbZrO_3$ together are excellent at improving temperature dependence but the $BaTiO_3$ is needed to help modify the Curie point as mentioned above.

The addition of up to 10 m/o $PbZn_{\frac{1}{3}}Nb_{\frac{2}{3}}O_3$ is useful in raising the dielectric constant. Up to <0.5 wt. % of ZnO can have the same effect. Up to 3 m/o $PbZn_{\frac{1}{2}}W_{\frac{1}{2}}O_3$ is similar in behavior, but the K improvement does not cause a deterioration in the temperature dependence.

$PbFe_{\frac{2}{3}}W_{\frac{1}{3}}O_3$ increases K but additions >6 m/o are not desirable since this addition also degrades the temperature dependence. This addition, along with CuO and $PbMg_{\frac{1}{4}}W_{\frac{1}{4}}Ti_{\frac{1}{2}}O_3$ (up to 9 m/o), results in a dielectric that has a high K, viz >16,000, excellent temperature dependence and low dissipation factors (≦0.7%).

DESCRIPTION OF THE DRAWING

The invention is further illustrated in the accompanying drawing wherein.

SPECIFIC EXAMPLES

Figure 1:
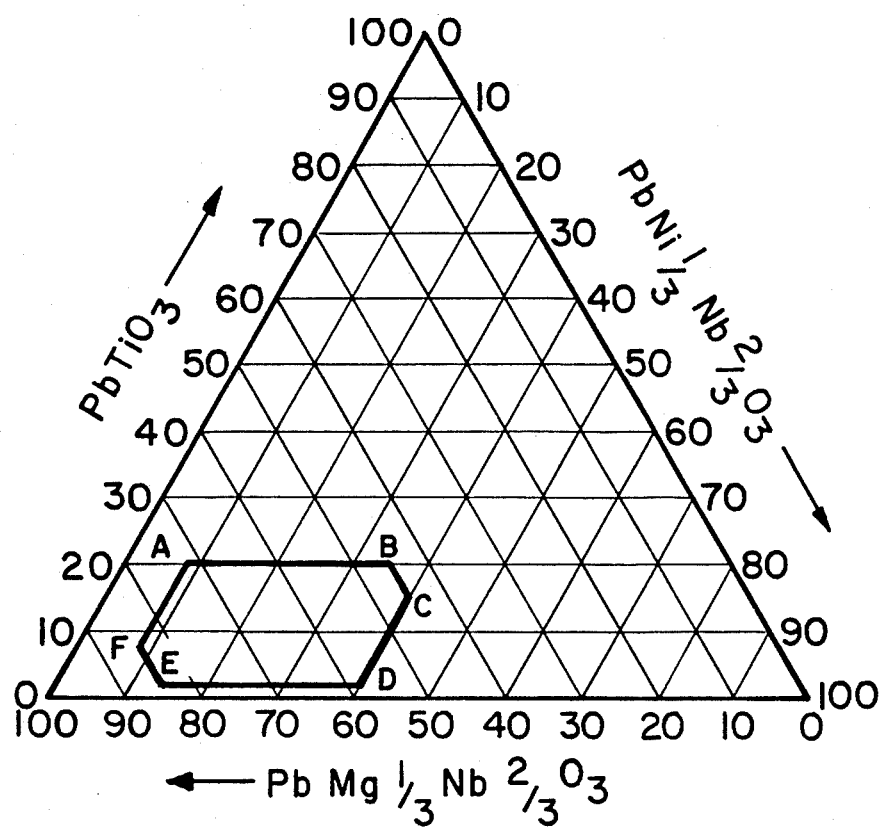
FIG. 1 is a triangular diagram showing, within the area ABCDEF, the ranges in mole percent (m/o) for the three basic ingredients of the inventive dielectric ceramic compositions.
Figure 2:
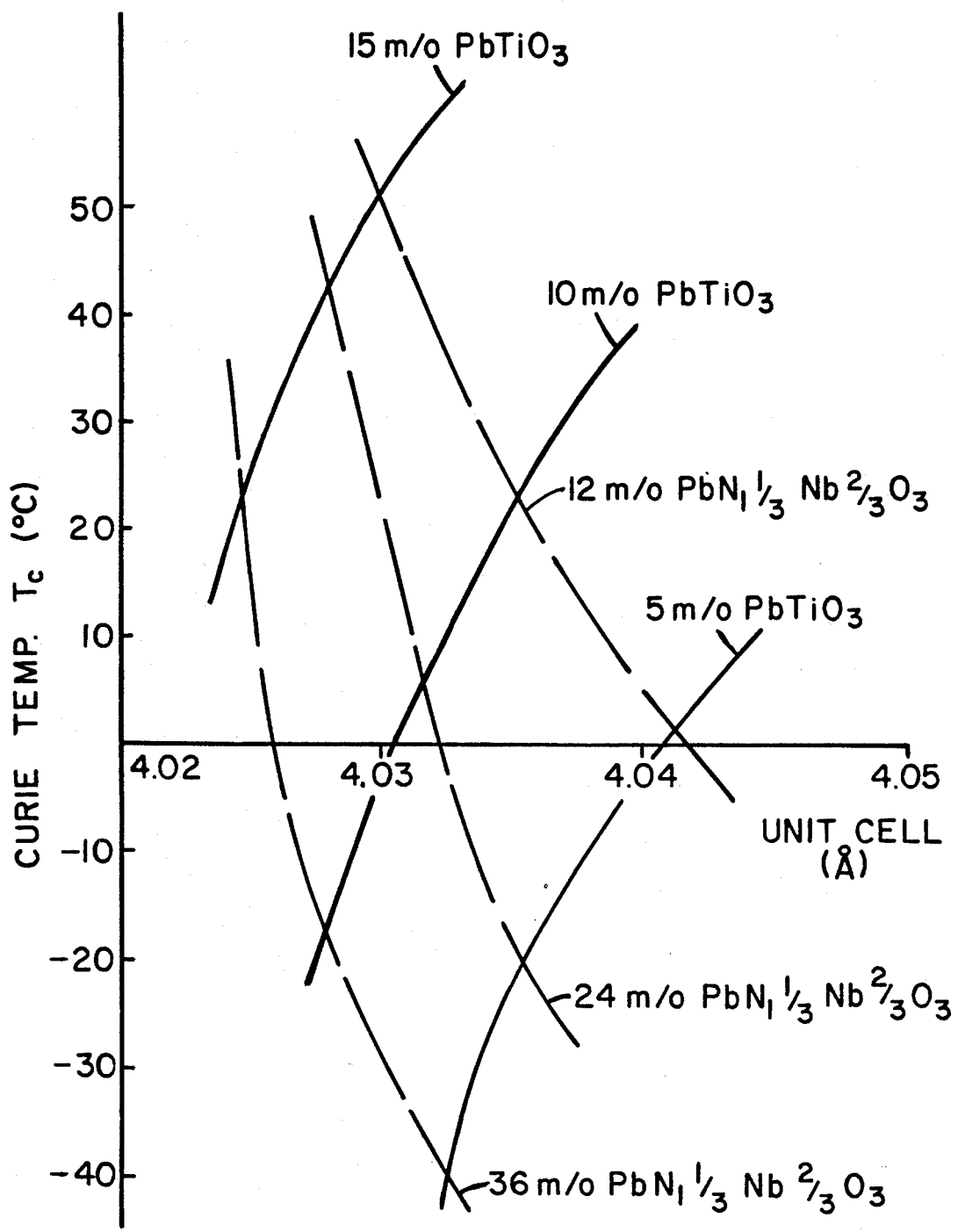
FIG. 2 is a graphical illustration of the influence that $PbNi_{\frac{1}{3}}Nb_{\frac{2}{3}}O_3$ and $PbTiO_3$ exert on the Curie temperature of $PbMg_{\frac{1}{3}}Nb_{\frac{2}{3}}O_3$. Curie temperature ($T_c$) is plotted along the vertical axis and unit cell size along the horizontal. The point of interest here is the contrasting effects of $PbNi_{\frac{1}{3}}Nb_{\frac{2}{3}}O_3$ and $PbTiO_3$ on Tc.

The invention is further described with reference to specific examples. These were carried out by formulating compositions, and preparing corresponding batches from available oxides and carbonates. Oxides of lead, and tungsten when used, were added subsequently to minimize volatilization.

Each batch was ball milled with ⅜" zirconia balls in a plastic bottle. The milled batch was then dried, crushed, and calcined at 950° C. for two hours. The calcined mass was crushed with a zirconia ball and the volatile oxide(s) added. The mix was again milled, dried and calcined, this time at 800° l C. for 16 hours. The crushing, milling and calcining were repeated a third time. After this, the material was moistened slightly, isopressed, and fired in an atmosphere containing lead oxide.

The dielectric properties of the fired ceramics were then measured. Capacitance and dissipation factor were measured as a function of temperature. Insulation resistance was measured at room temperature. X-ray diffraction was used to identify phases, and microstructure was checked by scanning electron microscopy of fractured sections.

TABLE I sets forth the exemplary compositions in molar percentages for the ultimate phases in the sintered products as identified by X-ray diffraction and as calculated from the batches. In each composition, the three primary components, lead magnesium niobate, lead nickel niobate and lead titanate, add to 100% and additives are calculated on that basis.

TABLE II sets forth the same compositions in a parts by weight basis as calculated on the oxide basis from the batch. Inasmuch as each approximates 100%, the values may be treated as percentages for most purposes.

TABLE III reports various dielectric properties recorded for the materials representing the Examples of TABLES I and II.

In the tables the following abbreviations are employed to conserve space:

| Formula | Abbreviation |
|---|---|
| $PbMg_{\frac{1}{3}}Nb_{\frac{2}{3}}O_3$ | PMN |
| $PbNi_{\frac{1}{3}}Nb_{\frac{2}{3}}O_3$ | PNiN |
| $PbTiO_3$ | PT |
| $PbZrO_3$ | PZ |
| $BaTiO_3$ | BT |
| $PbCu_{\frac{1}{2}}W_{\frac{1}{2}}O_3$ | PCW |
| $PbFe_{\frac{2}{3}}W_{\frac{1}{3}}O_3$ | PFW |
| $PbMg_{\frac{1}{4}}Ti_{\frac{1}{4}}W_{\frac{1}{2}}O_3$ | PMTW |
| $CuFe_{\frac{2}{3}}W_{\frac{1}{3}}O_3$ | CFW |
| $PbZn_{\frac{1}{3}}Nb_{\frac{2}{3}}O_3$ | PZN |
| $PbZn_{\frac{1}{2}}W_{\frac{1}{2}}O_3$ | PZW |

Also, in the tables, the following designations are employed to identify properties for which values are recorded:

$T_c$ = Curie temperature,
K = dielectric constant,
DF = diffusion or loss factor,
log ρ = logarithm base 10 of material resistivity, TCC = temperature coefficient of capacitance in 10°–25° C. and 25°–85° C. intervals, and is calculated as $$\frac{C_{10} - C_{25}}{C_{25}} \times 100$$

between 10°–25° C. and as $$\frac{C_{85} - C_{25}}{C_{25}} \times 100$$

between 25°–85° C.

TABLE I

| Ex. | PMN | PNiN | PT | PZ | Misc. |
|---|---|---|---|---|---|
| 1 | 100 | — | — | — | — |
| 2 | 97 | — | 3 | — | — |
| 3 | 77.6 | 19.4 | 3 | — | — |
| 4 | 76 | 19 | 5 | — | — |
| 5 | 74.4 | 18.6 | 7 | — | — |
| 6 | 72 | 18 | 10 | — | — |
| 7 | 83 | 12 | 5 | — | — |
| 8 | 78 | 12 | 10 | — | — |
| 9 | 73 | 12 | 15 | — | — |
| 10 | 71 | 24 | 5 | — | — |
| 11 | 66 | 24 | 10 | — | — |
| 12 | 61 | 24 | 15 | — | — |
| 13 | 49 | 36 | 15 | — | — |
| 14 | 70 | 12 | 10 | 8 | — |
| 15 | 87 | 8 | 5 | — | — |

| Ex. | PMN | PNiN | PT | PZ | BT | CuO | Misc. |
|---|---|---|---|---|---|---|---|
| 16 | 76 | 8 | 12 | 4 | — | — | .05 MgO |
| 17 | 74 | 8 | 9 | 4 | .04 | — | .05 MgO |
| 18 | 74 | 8 | 9 | 4 | 0.04 | — | .15 MgO |
| 19 | 64.5 | 24 | 7.5 | 4 | 0.16 | 0.7 | .15 MgO |
| 20 | 70.9 | 11.7 | 14.6 | — | — | — | 3 P CuW |
| 21 | 78 | 12 | 10 | — | — | 0.7 | — |
| 22 | 73.3 | 11.3 | 9.4 | — | — | 0.7 | 6 P FeW |
| 23 | 73.3 | 11.3 | 9.4 | — | — | — | 6 P FeW |
| 24 | 66.3 | 10.2 | 8.5 | — | — | — | 15 PMFeW |
| 25 | 75.7 | 11.6 | 9.7 | — | — | — | 3 CuFeW |
| 26 | 68.4 | 17.1 | 4.5 | — | — | — | 10 PZN |
| 27 | 75.7 | 11.6 | 9.7 | — | — | — | 3 PZW |
| 28 | 47.5 | 34.9 | 14.6 | 2 | 1 | 0.7 | — |
| 29 | 64.5 | 24 | 7.5 | 4 | — | 0.7 | .15 MgO |
| 30 | 76.9 | 11.5 | 9.6 | — | — | — | 0.97 PFW; 3.0 PMTW |

TABLE II

| Ex. | PbO | MgO | Nb₂O₃ | TiO₂ | NiO | ZrO₂ |
|---|---|---|---|---|---|---|
| 1 | 68.2 | 4.8 | 27 | — | — | — |
| 2 | 68.4 | 4.6 | 26.3 | 0.7 | — | — |
| 3 | 68.4 | 3.6 | 26.5 | — | 1.5 | — |
| 4 | 68.7 | 3.6 | 26.3 | — | 1.4 | — |
| 5 | 68.3 | 3.5 | 25.1 | 1.7 | 1.4 | — |
| 6 | 68.5 | 3.4 | 24.4 | 2.4 | 1.3 | — |
| 7 | 68.6 | 3.5 | 25.8 | 1.2 | 0.9 | — |
| 8 | 68.9 | 3.2 | 24.5 | 2.5 | 0.9 | — |
| 9 | 69.0 | 3.1 | 23.2 | 3.7 | 1.0 | — |
| 10 | 68.3 | 3.0 | 25.7 | 1.2 | 1.8 | — |
| 11 | 68.4 | 2.8 | 24.4 | 2.5 | 1.9 | — |
| 12 | 68.7 | 2.6 | 23.1 | 3.7 | 1.9 | — |
| 13 | 68.5 | 2.0 | 23.1 | 3.6 | 2.8 | — |
| 14 | 68.5 | 2.9 | 22.3 | 2.4 | 0.9 | 3.0 |
| 15 | 68.3 | 4.1 | 25.8 | 1.2 | 0.6 | — |
| 16 | 67.8 | 4.0 | 23.2 | 2.9 | 0.6 | |
| 17 | 68.0 | 3.8 | 23.4 | 2.2 | 0.6 | |
| 18 | 67.8 | 4.0 | 23.2 | 2.2 | 0.6 | |
| 19 | 68.0 | 2.6 | 24.2 | 2.0 | 1.8 | |
| 20 | 68.8 | 2.8 | 22.5 | 3.9 | 0.8 | |
| 21 | 68.2 | 3.7 | 24.4 | 2.5 | 0.9 | |
| 22 | 67.8 | 3.5 | 22.8 | 2.3 | 0.9 | |
| 23 | 68.0 | 3.5 | 22.9 | 2.3 | 0.9 | |
| 24 | 67.9 | 4.0 | 20.5 | 3.3 | 0.8 | |
| 25 | 67.0 | 3.6 | 23.9 | 2.8 | 0.9 | |
| 26 | 68.0 | 3.2 | 25.7 | 1.1 | 1.3 | |
| 27 | 68.5 | 3.1 | 23.7 | 2.4 | 0.9 | |
| 28 | 67.6 | 2.3 | 22.3 | 3.6 | 2.6 | |
| 29 | 67.8 | 3.3 | 23.7 | 1.8 | 1.9 | |
| 30 | 68.6 | 3.2 | 23.6 | 2.6 | 0.9 | |

| Ex. | CuO | Fe₂O₃ | WO₃ | ZnO | ZrO₂ | BaTiO₃ |
|---|---|---|---|---|---|---|
| 16 | — | — | — | — | 1.4 | — |
| 17 | — | — | — | — | 1.4 | 0.5 |
| 18 | — | — | — | — | 1.4 | 0.5 |
| 19 | 0.3 | — | — | — | 1.4 | 2.0 |
| 20 | 0.3 | — | 0.9 | — | — | — |
| 21 | 0.3 | — | — | — | — | — |
| 22 | 0.3 | 1.0 | 1.4 | — | — | — |
| 23 | — | 1.0 | 1.4 | — | — | — |
| 24 | — | — | 3.5 | — | — | — |
| 25 | 0.7 | — | 1.1 | — | — | — |
| 26 | — | — | — | 0.7 | — | — |
| 27 | — | — | 1.1 | 0.3 | — | — |
| 28 | 0.3 | — | — | — | 0.6 | 0.7 |
| 29 | 0.3 | — | — | — | 1.3 | — |
| 30 | 0.3 | 0.2 | 0.9 | — | — | — |

TABLE III

| Example | Sinter Temp. | Time | $T_c$ | K | D.F. |
|---|---|---|---|---|---|
| 1 | 1250 | 4 | 0 | 8,000 | 0.5 |
| 2 | 1250 | 4 | 13 | 15,000 | 0.1 |
| 3 | 1250 | 4 | −50 | 1,750 | 0.1 |
| 4 | 1250 | 4 | −16 | 760 | 0.3 |
| 5 | 1250 | 2 | −13 | 13,200 | 0.2 |
| 6 | 1250 | 2 | 15 | 19,000 | 1.0 |
| 7 | 1200 | 3 | 1 | 15,300 | 0.3 |
| 8 | 1200 | 3 | 30 | 14,600 | 3.5 |
| 9 | 1200 | 3 | 42 | 18,000 | 7.4 |
| 10 | 1200 | 3 | −19 | 10,000 | 0.1 |
| 11 | 1200 | 3 | 10 | 18,400 | 0.5 |
| 12 | 1200 | 3 | 25 | 23,800 | 8.0 |
| 13 | 1200 | 3 | 25 | 23,000 | 1.0 |
| 14 | 1200 | 3 | 42 | 24,000 | 8.8 |
| 15 | 1200 | 1 | 22 | 20,600 | 5.5 |
| 16 | 1200 | 4 | 2 | 19,000 | 0.4 |
| 17 | 1200 | 4 | 61 | 10,600 | 6.5 |
| 18 | 1200 | 4 | 41 | 22,000 | 8.4 |
| 19 | 1200 | 4 | 41 | 8,800 | 7.5 |
| 20 | 1180 | 4< | 2 | 12,600 | 0.1 |
| 21 | 1150 | 3 | — | 13,000 | 1.0 |
| 22 | 1150 | 3 | 20 | 18,700 | 1.5 |
| 23 | 1150 | 3 | 20 | 17,400 | 0.7 |
| 24 | 1200 | 3 | 20 | 22,000 | 5.5 |
| 25 | 1150 | 3 | 0 | 15,800 | 0.7 |
| 26 | 1100 | 3 | 20 | 14,100 | 1.0 |
| 27 | 1250 | 2 | 17 | 13,600 | 0.5 |
| 28 | 1100 | 3 | 20 | 21,000 | 2.5 |
| 29 | 1150 | 3 | 20 | 14,300 | 2.5 |
| 30 | 1155 | 2 | 20 | 15,650 | 0.3 |

| Example | D.F. | Log ρ | TCC (25–10°) | TCC (25–85°) |
|---|---|---|---|---|
| 1 | 0.5 | >14 | 13 | −56 |
| 2 | 0.1 | 11.9 | 11 | −57 |
| 3 | 0.1 | 13.4 | 11 | −20 |
| 4 | 0.3 | 13.1 | 5 | −18 |
| 5 | 0.2 | 12.2 | 16 | −58 |
| 6 | 1.0 | 12.9 | 5 | −61 |
| 7 | 0.3 | 12.7 | 6 | −61 |
| 8 | 3.5 | 11.9 | −19 | −45 |
| 9 | 7.4 | 11.6 | −22 | +17 |
| 10 | 0.1 | 12.9 | 15 | −58 |
| 11 | 0.5 | 12.0 | 1 | −62 |
| 12 | 8.0 | 12.2 | −21 | −47 |
| 13 | 1.0 | 12.1 | −9 | −65 |
| 14 | 8.8 | 10.6 | −25 | −25 |
| 15 | 5.5 | 12.1 | −15 | −55 |
| 16 | 0.4 | 12.8 | 11 | −63 |
| 17 | 6.5 | 11.8 | −33 | +13 |
| 18 | 8.4 | 11.8 | −34 | −32 |
| 19 | 7.5 | 11.9 | −25 | −38 |
| 20 | 0.1 | 13.2 | 16 | −55 |
| 21 | 1.0 | — | — | — |

TABLE III-continued

| | | | | |
|---|---|---|---|---|
| 22 | 1.5 | 12.4 | −8 | −49 |
| 23 | 0.7 | 12.1 | 0 | −54 |
| 24 | 5.5 | 9.6 | −6 | −58 |
| 25 | 0.7 | — | 11 | −54 |
| 26 | 1.0 | 12.1 | −3 | −52 |
| 27 | 0.5 | 12.5 | 11 | −58 |
| 28 | 2.5 | 12.3 | −8 | −59 |
| 29 | 2.5 | 12.3 | −8 | −52 |
| 30 | 0.3 | 10.4 | 1.5 | −54 |

The role of certain additives was studied by using, as a base composition, the material shown in TABLES I and II as number 30. To this base, zinc was added in increasing amounts, either as PZN or as ZnO. TABLE IV shows the additive and amount, as well as various relevant properties identified as in TABLE III. The materials, including additives, were fired at 1150° C. for three (3) hours.

TABLE IV

| Additive | $K_{25}$ | TCC 25-85 | TCC 25-10 | DF | Log ρ |
|---|---|---|---|---|---|
| 5 m/o PZN | 20260 | −55 | −7 | 1.1 | 11.9 |
| 10 m/o PZN | 21180 | −53 | −15 | 2.2 | 11.8 |
| 0.3 w/o ZNO | 19170 | −54 | −11 | 2.1 | 11.8 |
| 0.6 w/o ZnO | 21050 | −51 | −20 | 2.9 | 11.7 |

The effectiveness of the various rare earth metal oxides was determined by making a 0.5 m/o addition of each rare earth metal oxide to an example 30 batch. Each modified material was fired at 1150° C. for three hours and then measured as previously. The results are set forth in TABLE V using the same format and property symbols as in TABLE IV.

TABLE V

| Additive | $K_{25}$ | TCC 25-85 | TCC 25-10 | DF | Log ρ |
|---|---|---|---|---|---|
| $Y_2O_3$ | 17170 | −55 | −0.3 | 0.9 | 12.0 |
| $La_2O_3$ | 14700 | −55 | +13 | 0.3 | 12.3 |
| $CeO_2$ | 16090 | −56 | +10 | 0.2 | 12.0 |
| $Pr_6O_{11}$ | 7290 | −50 | +14 | 0.1 | 12.6 |
| $Nd_2O_3$ | 14970 | −56 | +13 | 0.2 | 12.2 |
| $Sn_2O_3$ | 14370 | −55 | +11 | 0.3 | 12.2 |
| $Eu_2O_3$ | 14380 | −56 | +11 | 0.3 | 12.3 |
| $Gd_2O_3$ | 15370 | −57 | 11 | 0.3 | 12.2 |
| $Tb_2O_3$ | 16020 | −57 | 9.4 | 0.5 | 12.3 |
| $Dy_2O_3$ | 16270 | −56 | 4.6 | 0.7 | 12.3 |
| $Ho_2O_3$ | 16710 | −54 | 1.2 | 0.7 | 12.0 |
| $Yb_2O_3$ | 17440 | −51 | −3.5 | 1.0 | 11.9 |

The effect of varying the amount of rare earth metal oxide was studied by adding amounts of $Yb_2O_3$ from 0 to 1.0 m/o to the base material, firing at 1150° C. for three hours, and measuring the relevant properties. The data observed are set forth in Table VI.

TABLE VI

| Amount (m/o) $Yb_2O_3$ | $K_{25}$ | TCC 25-85 | TCC 25-10 | DF | Log ρ |
|---|---|---|---|---|---|
| 0.0 | 19350 | −54 | −3.9 | 0.8 | 11.5 |
| 0.2 | 20120 | −54 | −2.7 | 0.6 | 11.6 |
| 0.4 | 18350 | −53 | −3.9 | 0.7 | 11.5 |
| 0.6 | 18120 | −52 | −4.2 | 0.8 | 11.7 |
| 0.8 | 17300 | −52 | −17.0 | 2.9 | — |
| 1.0 | 16470 | −44 | −6.6 | 1.3 | 11.6 |

The capability of the presently disclosed materials to be fired at temperatures of up to 1150° C., and the inability of current commercial brand material was illustrated by firing samples of the commercial material and the base material used as base for additives at temperatures from 800°–1150° C. for three hours and measuring properties as in prior studies. TABLE VII shows the values observed.

TABLE VII

| Temp. | $K_{25}$ | DF | TCC 25-85 | TCC 25-10 | Log ρ |
|---|---|---|---|---|---|
| Commercial | | | | | |
| 800 | 5240 | 2.1 | −28 | −5.1 | 9.70 |
| 850 | 5720 | 1.4 | −27.8 | −2.3 | 10.00 |
| 900 | 10,170 | 1.5 | 39 | 6.0 | 10.4 |
| 950 | 12,660 | 1.9 | −45.1 | −1.7 | 12.3 |
| 1000 | 13,880 | 2.0 | 47.2 | −8.5 | 12.5 |
| 1050 | 14,580 | 2.0 | 48.8 | −8.8 | 12.3 |

| Temp. | $K_{25}$ | DF | TCC 10-25 | TCC 25-85 | |
|---|---|---|---|---|---|
| Application | | | | | |
| 900 | 16,400 | 1.9 | +.6 | −54 | |
| 960 | 18,450 | 1.7 | +5. | −49 | |
| 1020 | 17,391 | 1.2 | +5 | −51 | |
| 1050 | 18,800 | 1.4 | 1. | −47 | |
| 1125 | 18,600 | 1.1 | 1. | −46 | |
| 1150 | 18,900 | 1.8 | 3. | −53 | |

I claim:

1. A dielectric ceramic composition consisting essentially of $PbMg_{\frac{1}{3}}Nb_{\frac{2}{3}}O_3$, $PbNi_{\frac{1}{3}}Nb_{\frac{2}{3}}O_3$, and $PbTiO_3$ within respective ranges of 45–85 m/o, 8–40 m/o and 2–20 m/o.

2. A composition in accordance with claim 1 containing, as an additive, MgO in an amount of up to 5 m/o in excess of the stoichiometry of the $PbMg_{\frac{1}{3}}Nb_{\frac{2}{3}}O_3$ component.

3. A composition in accordance with claim 1 containing, as an additive, up to 5 m/o $BaTiO_3$.

4. A composition in accordance with claim 3 containing, as an additive, up to 5 m/o MgO in excess of the stoichiometry of the $PbMg_{\frac{1}{3}}Nb_{\frac{2}{3}}O_3$ component.

5. A composition in accordance with claim 1 containing, as an additive, up to 8 m/o $PbZrO_3$.

6. A composition in accordance with claim 1 containing, as an additive, up to 3 m/o $CuFe_{\frac{2}{3}}W_{\frac{1}{3}}O_3$.

7. A composition in accordance with claim 1 containing, as an additive, up to 9 m/o $PbMg_{\frac{1}{3}}Ti_{\frac{1}{3}}W_{\frac{1}{3}}O_3$.

8. A composition in accordance with claim 1 containing, as an additive, up to one m/o CuO.

9. A composition in accordance with claim 1 containing, as an additive, up to 10 m/o $PbZn_{\frac{1}{3}}Nb_{\frac{2}{3}}O_3$.

10. A composition in accordance with claim 1 containing, as an additive, up to one m/o ZnO.

11. A composition in accordance with claim 1 containing, as an additive, at least one rare earth metal oxide, other than $Pr_6O_{11}$, the total of such oxides being up to 1 m/o.

12. A composition in accordance with claim 11 wherein the rare earth metal oxide is $Yb_2O_3$.

13. A composition in accordance with claim 1 which has a dielectric constant over 16,000 and contains a combination of these additives: up to one m/o CuO, up to 6 m/o $PbFe_{\frac{2}{3}}W_{166}O_3$, and up to 9 m/o $PbMg_{\frac{1}{3}}W_{\frac{1}{3}}Ti_{\frac{1}{3}}O_3$.

14. A dielectric ceramic composition consisting essentially in weight percent as calculated on an oxide basis of,

| Composition Field | |
|---|---|
| PbO | 60.0 wt. % to 70.0 wt. % |
| MgO | 1.0 wt. % to 5.0 wt. % |

-continued

| Composition Field | |
|---|---|
| NiO | 0.1 wt. % to 3.1 wt. % |
| $Fe_2O_3$ | 0.1 wt. % to 2.0 wt. % |
| $Nb_2O_5$ | 12.0 wt. % to 27.0 wt. % |
| $TiO_2$ | 1.0 wt. % to 8.0 wt. % |
| $WO_3$ | 0.2 wt. % to 5.0 wt. % |
| BaO | 0.0 wt. % to 3.0 wt. % |
| CuO | 0.1 wt. % to 2.0 wt. % |
| ZnO | 0.0 wt. % to 1.0 wt. % |
| $ZrO_2$ | 0.0 wt. % to 3.0 wt. % |
| Rare-Earths (excluding $CeO_2$, $Pr_6O_{11}$, $La_2O_3$) | 0.0 wt. % to 1.0 wt. % (total) |

15. A ceramic capacitor element consisting essentially of 45–85 m/o $PbMg_{\frac{1}{3}}Nb_{\frac{2}{3}}O_3$, 8–36 m/o $PbNi_{\frac{1}{3}}Nb_{\frac{2}{3}}O_3$, and 2–20 mol % $PbTiO_3$.

16. A ceramic capacitor having a dielectric constant of at least 16,000, a dissipation factor less than 3.0 pct meets the Z5U EIA temperature specification of +22% to −56% change in capacitance between 10° C. and 85° C., consists essentially of $PbMg_{\frac{1}{3}}Nb_{\frac{2}{3}}O_3$, $PbNi_{\frac{1}{3}}Nb_{\frac{2}{3}}O_3$ and $PbTiO_3$ within respective range of 45–85 m/o, 8–40 m/o and 2–20 m/o, and additionally contains one or more of the following additives: up to one m/o CuO, up to 3 m/o $CuFe_{\frac{2}{3}}W_{\frac{1}{3}}O_3$; up to 2 m/o $BaTiO_3$, up to 4 m/o $PZrO_3$, up to 1 m/o rare earth metal oxide, up to ½ m/o ZnO.

17. A ceramic capacitor in accordance with claim 16 having fugitive carbon electrodes attached thereto.

18. A method of minimizing the development of pyrochlore in firing a MgO containing ceramic dielectric composition which comprises adding to the ceramic composition $BaTiO_3$.

19. A method according to claim 18 wherein up to one m/o of CuO or up to 3 m/o $CuFe_{\frac{2}{3}}W_{\frac{1}{3}}O_3$ is further included in the composition.

* * * * *

UNITED STATES PATENT AND TRADEMARK OFFICE
CERTIFICATE OF CORRECTION

PATENT NO. : 4,712,156
DATED : December 8, 1987
INVENTOR(S) : Pronob Bardhan

It is certified that error appears in the above-identified patent and that said Letters Patent is hereby corrected as shown below:

Column 3, line 43, "45-80" should read --45-85--.

Column 6, line 20, "800° I C." should read --800°C.--.

Column 9, line 7, (Example 27), "11" should read --10--.

Column 10, line 59, "$PbFe_{2/3}W_{166}O_3$" should read --$PbFe_{2/3}W_{1/3}O_3$--.

Signed and Sealed this

Twenty-fifth Day of October, 1988

Attest:

DONALD J. QUIGG

Attesting Officer

Commissioner of Patents and Trademarks